June 6, 1961 R. P. DIMMER 2,987,615

MOBILE SELECTOR FOR COMMON CARRIER RADIO TELEPHONE SERVICE

Filed Dec. 23, 1957 2 Sheets-Sheet 1

INVENTOR.
ROBERT P. DIMMER
BY C. R. Sipe
ATTY

June 6, 1961 R. P. DIMMER 2,987,615

MOBILE SELECTOR FOR COMMON CARRIER RADIO TELEPHONE SERVICE

Filed Dec. 23, 1957 2 Sheets-Sheet 2

INVENTOR.
ROBERT P. DIMMER

BY C. R. Sipe

ATTY.

United States Patent Office 2,987,615
Patented June 6, 1961

2,987,615

MOBILE SELECTOR FOR COMMON CARRIER RADIO TELEPHONE SERVICE

Robert P. Dimmer, Lombard, Ill., assignor to Automatic Electric Laboratories, Inc., a corporation of Delaware Filed Dec. 23, 1957, Ser. No. 704,728
3 Claims. (Cl. 250—6)

The present invention relates to telephone systems in general, and more particularly, to radio telephone systems wherein radio transmitters and receivers are employed for establishing telephone connections between fixed stations of a telephone system and mobile stations such as automobiles, boats, and the like.

The present invention discloses a mobile selector circuit similar to that shown in my Patent 2,693,526, issued November 2, 1954, covering a Single Channel Single Frequency Mobile Radio Telephone System. In said patent, I have shown a system wherein the carrier frequency transmitted from the fixed radio control or base station is received by all of the mobile subscribers having receivers tuned to the carrier, and wherein the carrier is modulated in accordance with digital impulses so as to operate rotary switches at each of the mobile stations. As described in this patent, the carrier frequency transmitted by the base station is used to prevent the rotary switch wipers in the mobile stations from restoring, and also to prevent non-called mobile subscribers from eavesdropping or breaking in on a call.

This patented system has been found to be undesirable in some respects, particularly since the operator at the base station cannot re-dial the called party without disconnecting from the circuit to thereby turn off the carrier frequency, thereby releasing the various rotary switches; and since the non-called mobile subscribers cannot break in on the circuit in an emergency.

Accordingly, it is an object of this invention to provide a mobile selector unit for single channel radio telephone systems that will permit the base station operator to re-dial the called party without having to disconnect from the circuit.

A further object of the invention to provide in a telephone system of the character described, a mobile selector circuit arrangement that permits non-called mobile subscribers to break-in on a call in an emergency.

Figure 1:
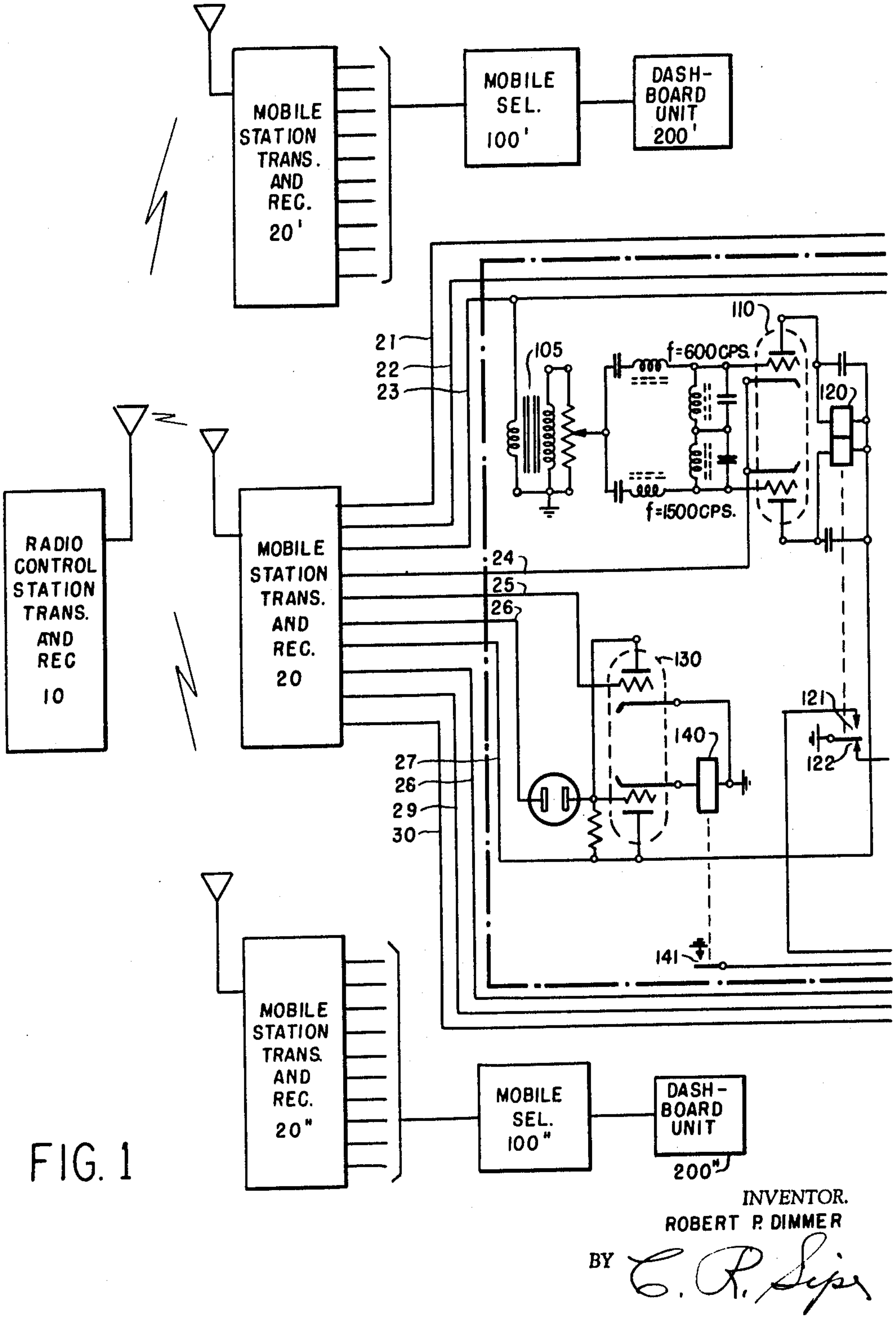
Figure 2:
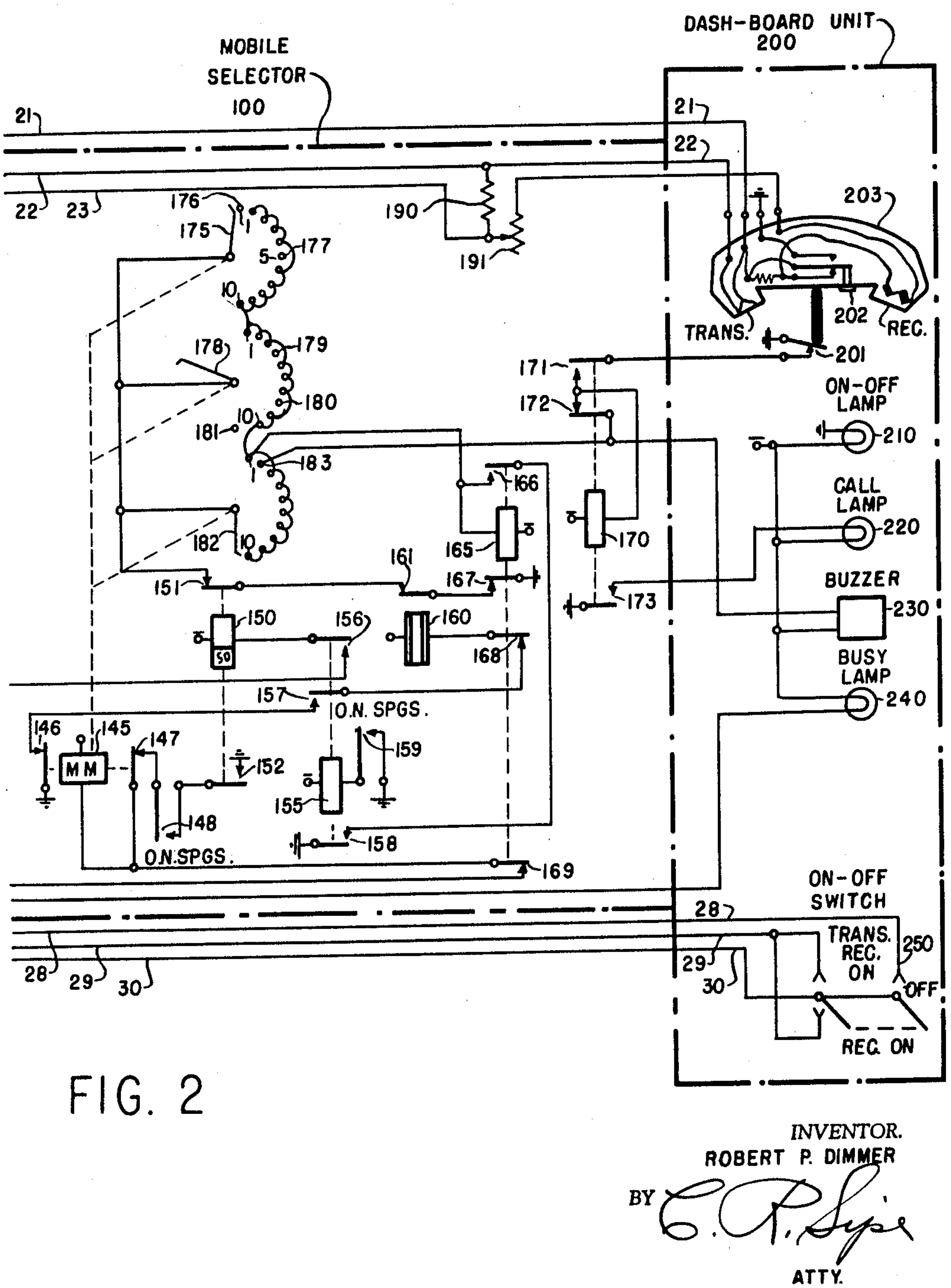

Other objects and features of the invention will become apparent from the following specification and claims, taken in conjunction with the accompanying drawings wherein:

FIGS. 1 and 2 show the circuits of my mobile selector unit and dash-board unit, and their relationship to the overall telephone system.

Radio control station 10 consists of a radio receiver, a radio transmitter, and telephone office equipment by which an operator connects calls between fixed and mobile subscribers. This control station equipment may be of any well-known type, and details of the operation will not be described here. It should suffice to point out that the control station transmits on a first carrier frequency, and receives on a second carrier frequency; and that the operator equipment comprises conventional toll position equipment including a dial for dialling the directory call numbers of the mobile stations tuned to the radio control station.

Each of the mobile stations is provided with radio transmitting and receiving equipment, such as 20, 20′, 20″ . . ., wherein the transmitter is tuned to the above-mentioned second carrier frequency and the receiver is tuned to the above-mentioned first carrier frequency. Thus, signals transmitted from station 10 are received at each mobile station, and signals transmitted from any of the mobile stations are received at the control station.

Each of the mobile stations is provided with a selector 100, 100′, 100″ . . ., and dash-board unit 200, 200′, 200″ . . . . These units, which are individually connected to their respective transmitting-and-receiving units, will now be described in detail by reference to selector 100 and dash unit 200.

*Incoming call to a mobile station*

In order to receive calls, the mobile subscribers must place their equipment in a standby condition. This is accomplished by operating on-off switch 250 in dash unit 200 (see FIG. 2) to the Receiver-on position. This completes a circuit over leads 29 and 30, and causes power relays (not shown) in station 20 to operate and thereby connect battery potential to the circuits in selector 100 and dash unit 200; and also conditions the receiver to receive signals from radio control station 10. When the equipment is in the standby condition, on-off pilot lamp 210 is energized.

When a fixed subscriber initiates a call to a mobile subscriber, the calling party is connected to radio control station 10. The operator at station 10 then places a fixed radio transmitter on the air by inserting a cord into an appropriate radio jack on her switchboard. When a call is so initiated, the radio carrier comes on the air modulated with a 600 cycle tone. This signal is transmitted to the receiving equipment 20 at each of the mobile stations, and equipment therein (not shown) causes a high voltage to be placed on lead 27, and a busy marking signal to be transmitted over leads 25 and 26, thereby causing tube 130 to conduct. Relay 140 is thereby energized, closing contact 141, and ground at contact 141 is thereby effective to energize busy lamp 240 in dash-board unit 200 . . . .

The modulated carrier wave is also effective to cause the transmission of a signal over receiver output lead 23 to transformer 105, and to cause the completion of an operating circuit over lead 24 for tube 110. The signal received at transformer 105 is transmitted through the 600-cycle filter circuit to the upper triode of tube 110, thereby energizing relay 120 over its upper winding by way of a circuit including leads 24 and 27. Contact 121 thereby completes an obvious operating circuit for motor magnet 145. Contacts 146 and 147 are thereby opened, and the indirect-drive type rotary switch operating mechanism is conditioned to rotate wipers 175, 178 and 182 when motor magnet 145 restores.

Approximately two seconds after the first appearance of the 600-cycle tone on the carrier of transmitter 10, this 600-cycle tone is automatically replaced at station 10 by a 1500-cycle tone. When the 1500-cycle tone is received at the mobile station receiver 20, it is transmitted through transformer 105 and through the 1500-cycle filter circuit associated with the lower triode of tube 110, thereby causing this lower triode to conduct. Conduction of the lower triode causes current to flow through the lower winding of relay 120. Since the upper and lower windings of relay 120 are wired in a "bucking" direction, a point is reached where the decaying field of the top winding will equal the rising field of the lower winding, and relay 120 is momentarily restored. This momentary restoration of relay 120 causes the current to be removed from motor magnet 145, and causes the wipers 175, 178 and 182 to make the first rotary step; thereby moving contact 175 into engagement with bank contact 176.

When the rotary switch wipers move off normal, off-normal-spring contacts 148 and 159 are closed. Contact 148 completes a point in the normalizing circuit of motor magnet 145, and contact 159 completes an obvious operating circuit for relay 155. Operation of relay 155 closes contacts 156, 157 and 158, but these contacts are ineffective at this time.

The mobile selector 100 is now in condition to receive digital impulses. Relay 120 is held operated by the 1500-cycle per second tone flowing through the lower triode of tube 110; relay 140 is held operated to maintain busy lamp 240 operated by signals received over leads 25, 26 and 27; motor magnet 145 is held operated by ground at contact 121 in preparation for rotating the wipers 175, 178 and 182 responsive to digital impulses; and relay 155 is held operated by a circuit through off-normal-spring contact 159.

The equipment at radio control station 10 is arranged so that digital impulses dialled by the operator are transmitted as alternate splashes of 600 cycle and 1500 cycle tones. Thus, if a digit "3" is dialled by the operator at the telephone office, the first tone transmitted will be a 600 cycle frequency corresponding to the first digital impulse, followed by a switch to the 1500 cycle tone corresponding to the second digital impulse, thereafter followed by a 600 cycle frequency corresponding to the third digital impulse. Each time this tone change occurs, relay 120 is momentarily "kicked down" (restored), permitting motor magnet 145 to rotate wipers 175, 178 and 182 to the next rotary position. It should be noted that slow operate relay 150 will not operate due to the momentary restoration of contact 122 during the digital impulse transmission; and it should also be noted that slow-release relay 160 is arranged to operate when motor magnet 145 restores responsive to the first impulse of each digit, and remains operated until after the last impulse of a series has been received. Relay 160 is thereby effective to keep ground at contact 167 removed from the switch wipers until after each digit has been received.

As tone splashes are received at the mobile station receivers 20, 20', 20'' . . ., corresponding to digital impulses transmitted from the operator's location at station 10, wipers such as 175, 178 and 182 in each mobile station are rotated in the above described manner. Assuming that mobile selector 100 is being called, the operator will dial numbers 59432. The first digit 5 causes wiper 175 to move from contact 176 to contact 177, whereafter relay 160 restores. Ground at contact 167 is ineffective at this time, since contact 177 is not wired. It should be noted that in a mobile unit having a different first digit, for example 6, the contact corresponding to 177 would be wired, and the relay such as 165 would operate over an obvious circuit. This would prevent the wipers from rotating responsive to later digital impulses, as will be described below.

After wiper 175 is rotated to contact 177, the digit 9 is transmiitted from station 10, causing wiper 178 to move into engagement with bank contact 179. Relay 160 again restores, and ground at contact 167 is again ineffective since contact 179 is not wired. In a similar manner, as the last three digits are dialled, wiper 178 is moved into engagement with bank contact 180 due to the third digit 4 and then moved into engagement with bank contact 181 as the fourth digit 3 is received, whereafter wiper 182 is moved into engagement with bank contact 183 as the last digit 2 is received. When relay 160 restores following receipt of this last digit, ground at contact 167 is extended through contacts 161, 151, wiper 182, contacts 183 and 172 to relay 170, with a parallel circuit through buzzer 230 to battery. Relay 170 is thereby operated and locked to ground at contact 201; and contact 173 of relay 170 causes call lamp 220 to be energized.

It will be noted that 23 pulses were required to step the wipers from the first rotary position, which would be contact 176, to the last rotary position, or contact 183. Each of the mobile selector units is arranged to have a different call number, wherein the digits total 23. In the present signalling technique, the 23rd pulsed tone transmitted from station 10, remains on the air for approximately 4 seconds, and then changes again to the opposite tone for an instant, and then goes off. This change in tone causes motor magnet 145 to momentarily restore after the buzzer has been operated for 4 seconds, thereby stepping wipers 175, 178 and 182 to the next rotary position and opening the buzzer circuit. When the tone goes off, relay 120 restores for a long enough period to cause operation of relay 150. Contact 151 removes ground from the switch wipers to prevent operation of relay 165 as the wipers are being restored to their home positions; and contact 152 completes a normalizing circuit for magnet 145, including contacts 148 and 147. The wipers are thereby restored to the home position, whereupon contacts 148 and 159 open. The opening of contact 148 prevents further operation of motor magnet 145. Contact 159 opens the circuit of relay 155, causing it to restore, and this opens contact 156 and causes relay 150 to restore. Contact 157 opens the circuit to relay 160 to prevent this relay from locking operated to ground at contact 146. Contact 158 is also opened, to open the locking circuit of relay 165, as will be explained below.

From the above description, it will be seen that the called mobile subscriber receives an audible tone for a period of four seconds, and a visual signal that is maintained by hook switch contact 201 until the receiver is lifted from the hook. Thus, if the called subscriber is not in a position to hear the buzzer when the call comes into his selector, he will be notified by the visual signal at a later time. The called subscriber could then contact the operator at radio control station 10 and determine whether or not the calling party left a message.

In the event that the call transmitted from station 10 is intended for a mobile subscriber in one of the other stations in the system, rather than the mobile subscriber associated with mobile selector unit 100, the following operation would occur. After a digit is transmitted that does not correspond to the digit of mobile selector 100, one of the wipers 175, 178 or 182 will be in engagement with a bank contact other than contacts 176, 177, 179, 180 or 183. In that event, when relay 160 restores following that particular digit, a circuit is completed from ground at contact 167 through contacts 161 and 151, and through one of the three wipers to relay 165 and battery. Relay 165 then operates, and the contacts associated therewith cause the following operations: contacts 166 complete a locking circuit for relay 165, to ground at contact 158; contact 167 opens the original operating circuit of relay 165; contact 168 opens the circuit to relay 160; and contact 169 opens the pulsing circuit of motor magnet 145 to prevent further operation of the motor magnet as subsequent digits are transmitted from the radio control station 10. Relay 120 thereafter follows the digital impulses in the above described manner, until all the digits have been transmitted, but magnet 145 is not operated. When the tones are removed from lead 23, relay 120 restores and ground at contact 122 again operates slow operating relay 150, thereby causing ground at contact 152 to restore the rotary switch wipers to the home position in the manner described above. Thereafter, when relay 155 restores following normalizing of the rotary switch wipers, contact 158 opens the holding circuit of relay 165, and relay 165 is thereby released. Mobile selector unit 100 is then prepared to receive subsequent calls.

It should be noted that since the wipers of each mobile selector are restored to the normal position immediately after the digital impulse information is transmitted, it is possible for the mobile service operator at station 10 to re-dial without pulling her cord, providing there is a re-dial key, and providing the radio control terminal permits this feature. Thus, if the operator makes a mistake in dialling the number, or for some other reason wishes to re-dial the call subscriber, it will be relatively convenient for her to do so, without the necessity of disconnecting and then re-inserting her patch cord.

*Outgoing call from mobile station to a fixed or mobile station*

When a mobile subscriber desires a connection with another subscriber, he operates on-off switch 250 to the transmitter-receiver-on position, thereby connecting leads 28, 29 and 30 and conditioning the mobile station transmitter and receiver 20 for operation. Thereafter, by depressing push-to-talk switch 202 of handset 203, a circuit is completed over lead 21 for connecting the mobile transmitter output to the mobile station antenna, and the operator at station 10 is thereby notified of an incoming call, all in the well-known manner. The operator then answers the call, and talks to the calling mobile subscriber by way of conductors 22 and 23, and volume control circuit 190—191, to obtain the called subscriber's number. The operator then contacts a fixed subscriber in the well-known manner, or another mobile subscriber in the manner described above, and completes a talking connection between the calling and called subscribers.

When a mobile subscriber is about to initiate a call his busy lamp will notify him whether or not the channel is already in use. If the lamp is on, he may either wait until it goes off to indicate that the channel is not in use, or, if he desires, he may "break in" on the call.

It should be noted that if stray pulses are received at the mobile station receiver, wipers 175, 178 and 182 will be rotated off-normal and ground at contact 152 will eventually cause the circuit to restore, all in the above described manner.

What has been described is considered to be the preferred embodiment of my invention, but it should be understood that modifications may be made in the structure and organization of my invention without departing from the spirit thereof as defined in the appended claims.

What is claimed is:

1. In a radio telephone system, a base station including a radio transmitter having means for transmitting call signals by modulating a carrier frequency by signaling currents, a plurality of mobile stations each having a calling code comprising a plurality of digits and each code comprising the same total number of impulses of said signaling currents in all of the digits of the code, a rotary switch in each mobile station having wipers, means in each mobile station operated responsive to the signaling currents of the digits of a called number to progressively move the wipers to a new position in response to the impulses of each digit only as long as the digits correspond to the digits of the called number of that station, a signal position in the switch in each station having means connected thereto for operating a call signal if that position is reached by one of the wipers thereat, means in each station other than the called station for stopping and holding the wipers at that station in some position other than the signal position whenever a digit does not correspond to the digit of called number of that station to thereby prevent the operation of the signal thereat, the wipers at the called station progressively moved to the signal position without release, as the total number of impulses are received, to operate the signal operating means connected thereto, and means for releasing the wipers at all stations both called and non-called as soon as the signal at the called station has been operated, while preventing the signal at the called station from being extinguished.

2. A radio telephone system such as claimed in claim 1, in which there is a visual and an audible signal controlled by the means connected to the final position, together with means for stepping the wiper away from said final position after a predetermined interval to stop the operation of the audible signal, and the releasing means then operating the wipers forward to their normal position, while maintaining the visual signal operated.

3. In a radio telephone system, a fixed station and a plurality of mobile stations, means at the base station for transmitting a carrier wave to the mobile stations and for then modulating the carrier by applying pulses of signaling current thereto and then stopping said modulations by removing the signaling current from the carrier, a rotary switch at each mobile station, means in each mobile station operated responsive to received impulses of said signaling current to step the wipers of the switches, a signal position in each switch, means in each station other than the called station, operated when certain positions other than the signal position are reached, to stop further operation of the switch wipers by subsequent impulses and for holding the wipers thereat in their advanced positions, means for progressively moving the wipers of the switch at the called station to the signal position to signal that station, means in each station whether called or non-called, for initially releasing the switch therein only when the impulses of the digits of the called number have stopped, means for locking in the signal at the called station independent of the release of the switch thereat, and means for reoperating the switches at all stations without removing the carrier at the calling station.

References Cited in the file of this patent

UNITED STATES PATENTS

| | | |
|---|---|---|
| 2,478,361 | Bartelink | Aug. 9, 1949 |
| 2,533,662 | Bartelink | Dec. 12, 1950 |
| 2,693,526 | Dimmer | Nov. 2, 1954 |
| 2,722,598 | McDonald | Nov. 1, 1955 |